United States Patent
Ho et al.

(10) Patent No.: US 7,794,227 B2
(45) Date of Patent: Sep. 14, 2010

(54) INJECTION MOLD HAVING AN AIR CHANNEL

(75) Inventors: Tse-Chia Ho, Tu-Cheng (TW); Sy-Tsair Yeh, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 233 days.

(21) Appl. No.: 12/100,272

(22) Filed: Apr. 9, 2008

(65) Prior Publication Data
US 2009/0110767 A1    Apr. 30, 2009

(30) Foreign Application Priority Data
Oct. 31, 2007    (CN) .......................... 2007 1 0202329

(51) Int. Cl.
*B29C 45/63*    (2006.01)
(52) U.S. Cl. ...................................... 425/542; 425/812
(58) Field of Classification Search .......... 425/808.812, 425/542, 808, 812
See application file for complete search history.

(56) References Cited

U.S. PATENT DOCUMENTS

| | | | |
|---|---|---|---|
| 4,431,047 A | 2/1984 | Takeshima et al. | |
| 5,114,660 A | 5/1992 | Hendry | |
| 5,151,279 A * | 9/1992 | Kimura | 425/567 |

FOREIGN PATENT DOCUMENTS

| JP | 11245258 A | 9/1999 |
|---|---|---|
| TW | 250073 | 3/2006 |

OTHER PUBLICATIONS

Rosato et al., Injection Molding Handbook, 1995, Chapman & Hill, p. 259.*

* cited by examiner

*Primary Examiner*—Tim Heitbrink
(74) *Attorney, Agent, or Firm*—Andrew C. Cheng

(57) ABSTRACT

A mold for injection molding includes a male mold portion, and a female mold portion mating with the male mold portion to define a parting face therebetween. The female mold includes a mold cavity defined at the parting face, an injection aperture communicated with the mold cavity, an air channel defined at the parting face and evenly spaced from and partially surrounding the mold cavity, a spacing portion formed between the mold cavity and the air channel, and a gap formed between the male mold portion and the spacing portion for transmitting air from the mold cavity to the air channel during injection of molten plastic. When injecting molten plastic, air in the mold cavity can be expelled in time under pressure of the molten plastic and through the air channel. Therefore, the surface quality of the molded product can be improved, by avoiding formation of air holes, fissure.

9 Claims, 2 Drawing Sheets

INJECTION MOLD HAVING AN AIR CHANNEL

RELATED FIELD

The present invention relates to a mold for injection molding of plastic articles and, in particular, to a mold for injection molding having an efficient air channel.

BACKGROUND

It is known in the plastic molding art to use pressured molten plastic in conjunction with the molding of plastic articles. Conventionally, a mold includes a mold cavity for molding a product. However, before injecting the molten plastic into the mold cavity, air may be retained in the mold cavity. So, the air must be expelled from the mold cavity via an air channel. If not, surface quality of the molded product is decreased and the molded product may have flaws such as air holes, fissure, crazing, and so on.

It is desired to provide a mold for injection molding with an efficient air channel for expelling air from the mold cavity.

SUMMARY

In accordance with the present invention, a mold for injection molding includes a male mold portion, and a female mold portion mating with the male mold portion to define a parting face. The female mold includes a mold cavity defined in the parting face, an injection aperture communicated with the mold cavity, an air channel defined in the parting face and spacedly surrounding the mold cavity, a spacing portion formed between the mold cavity and the air channel, and spaced from the male mold portion to define a gap for transmitting air from the mold cavity to the air channel during injection of molten plastic.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of exemplary embodiments thereof and with reference to the accompanying drawings, in which.

DETAILED DESCRIPTION OF EXEMPLARY EMBODIMENTS

A detailed explanation of a mold for injection molding according to an exemplary embodiment of the present invention will now be made with reference to the drawings attached hereto.

Figure 1:
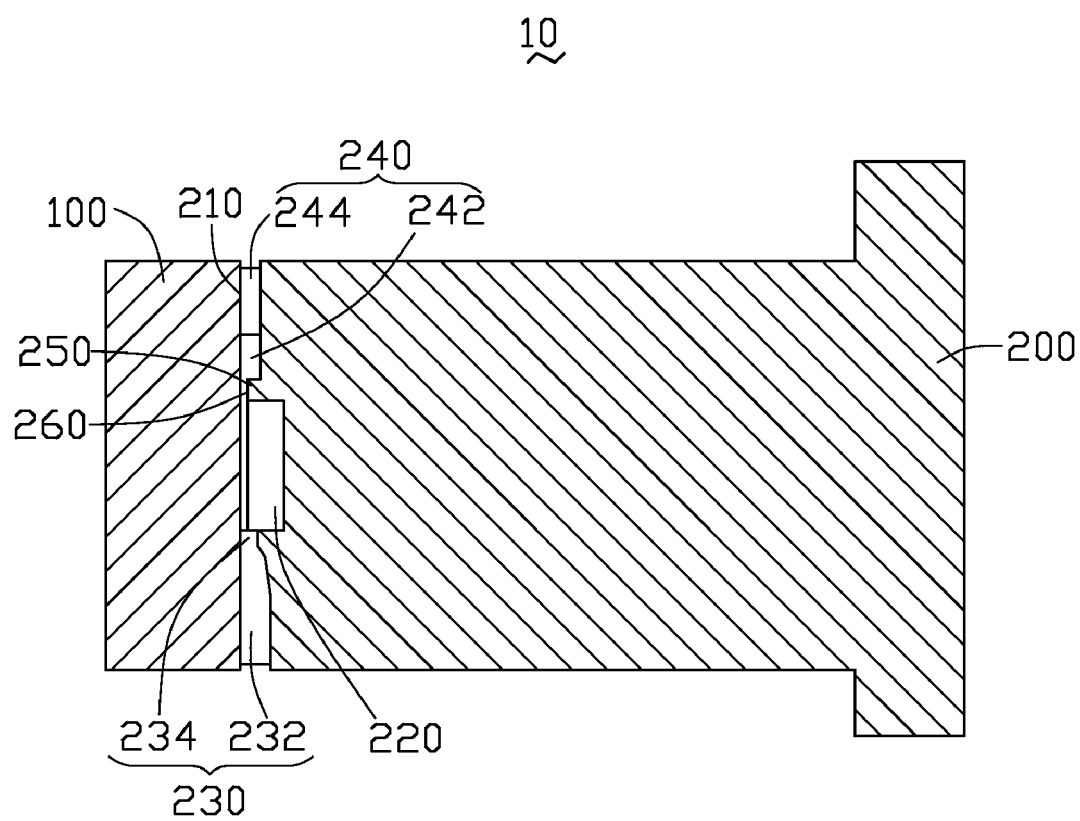
FIG. 1 is a cross-sectional view of a mold for injection molding in accordance with an exemplary embodiment of the present invention.

Referring to FIG. 1, a mold 10 according to the present embodiment is shown. The mold 10 includes a male mold portion 100 and a female mold portion 200, both suitably of metal. The male mold portion 100 connected to an injection molding machine (not shown) when mated with the female mold portion 200 define a parting face 210 therebetween.

Figure 2:
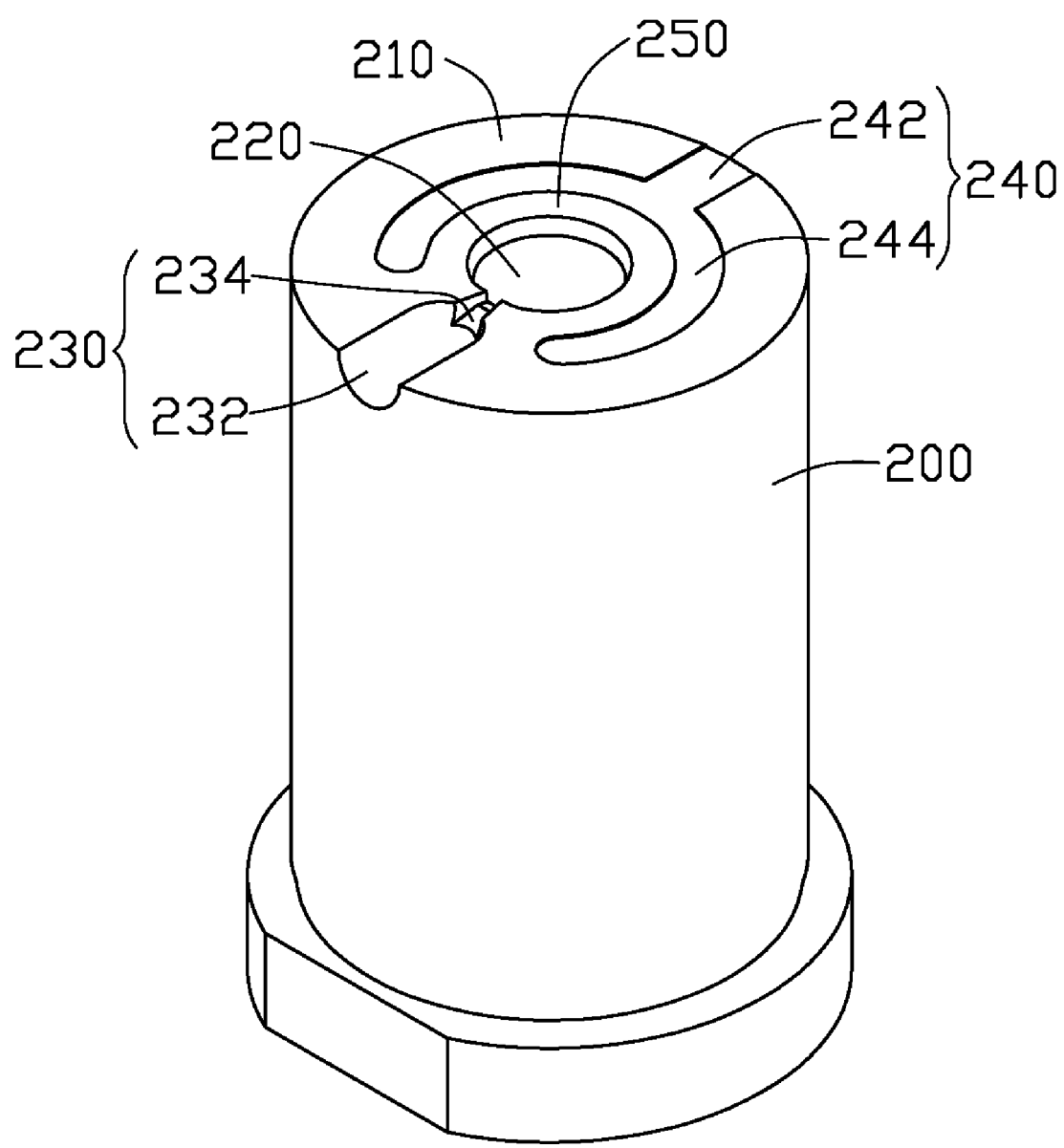
FIG. 2 is an isometric view of a male molding portion of the mold of FIG. 1.

Referring to FIG. 2, the female mold portion 200 includes a mold cavity 220, an injection aperture 230, an air channel 240, a spacing portion 250 formed between the mold cavity 220 and the air channel 240.

The mold cavity 220 is defined in the female mold portion 200 at the parting face 210 and has a form corresponding to that of an object to be molded, such as a lens, or the like.

The injection aperture 230 provides a continuous path therethrough for flow of molten plastic into the mold cavity 220. The injection aperture 230 includes an enlarged portion 232 and a narrow portion 234 connected to the enlarged portion 232. The enlarged portion 232 is configured for receiving an injection nozzle (not shown) of the injection molding machine. The injection nozzle is used for transporting the molten plastic into the mold. The narrow portion 234 communicates with the mold cavity 220. During injection of molten plastic, flow speeds of the molten plastic increase when it flows from the enlarged portion 232 into the narrow portion 234. Thus, the molten plastic efficiently fills the mold cavity 220.

The air channel 240 is defined at the parting face 210 and includes an arc-shaped portion 242 evenly spaced from and encircling a portion of the mold cavity 220 and an outlet 244 connected to the arc-shaped portion 242. The arc-shaped portion 242 is concentric with the mold cavity 220. The central angle of the arc-shaped portion 242 can be equal to or greater than 180°. In the present embodiment, the central angle of the arc-shaped portion 120 is 280°. A depth of the arc-shaped portion 242 from the parting face 210 may be 0.3 mm to 0.5 mm and a width of the arc-shaped portion 242 can be 2 mm to 3 mm for efficiently allowing air in the mold cavity 220 to escape through the air channel 240. The outlet 244 allows the air channel 240 to communicate with an exterior environment.

The spacing portion 250 is formed between the mold cavity 220 and the arc-shaped portion 242 for preventing molten plastic from flowing into the arc-shaped portion 242 of the air channel 240. A dimension of the spacing portion 250 can be 1.5 mm to 2.5 mm, and a gap 260 is defined between the spacing portion 250 and the male mold portion 100, which allows air to run from the mold cavity 220 into the arc-shaped portion 242. The gap 260 has a sufficiently small width, for example, 0.015 mm to 0.025 mm, depending on the viscosity of the molten plastic to actively prevent entry of the relatively high speed molten plastic during injection.

As described above, when injecting molten plastic, air in the mold cavity 220 can be expelled in time through the air channel 240 under pressure of the molten plastic. Therefore, the surface quality of the molded product can be improved, by avoiding formation of air holes, fissures, and so on.

It should be understood that the above-described embodiment is intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A mold for injection molding, comprising:
a male mold portion; and
a female mold portion mating with the male mold portion to define a parting face therebetween, the female mold portion comprising a mold cavity defined at the parting face, an injection aperture communicated with the mold cavity, an air channel defined at the parting face and evenly spaced from and partially surrounding the mold cavity, a spacing portion formed between the mold cavity and the air channel, and spaced from the male mold portion to define a gap for transmitting air from the mold cavity to the air channel during injection molding.

2. The mold as claimed in claim 1, wherein the air channel comprises an arc-shaped portion surrounding the mold cavity and an outlet connected to the arc-shaped portion, the outlet is communicated with an exterior environment.

3. The mold as claimed in claim 2, wherein the arc-shaped portion is concentric with the mold cavity.

4. The mold as claimed in claim 3, wherein a central angle of the arc-shaped portion is equal to or greater than 180°.

5. The mold as claimed in claim 3, wherein a central angle of the arc-shaped portion is 280°.

6. The mold as claimed in claim 1, wherein a dimension of the arc-shaped portion is 2 mm to 3 mm.

7. The mold as claimed in claim 1, wherein a depth of the arc-shaped portion from the parting surface is 0.3 mm to 0.5 mm.

8. The mold as claimed in claim 1, wherein a width of the gap is 0.015 mm to 0.025 mm.

9. The mold as claimed in claim 1, wherein the injection aperture comprises an enlarged portion and a narrow portion connecting the enlarged portion to the mold cavity.

\* \* \* \* \*